G. W. N. Yost,
Mower.
No. 85159.  Patented Dec. 22, 1868.
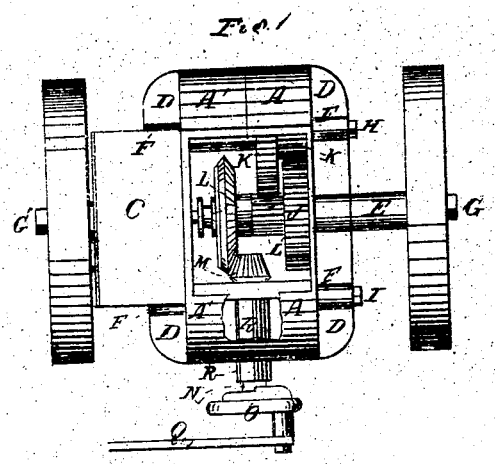
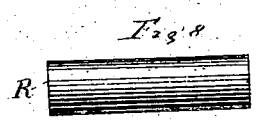
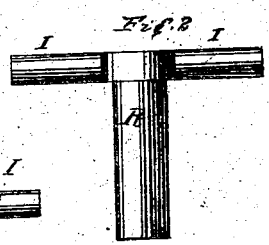
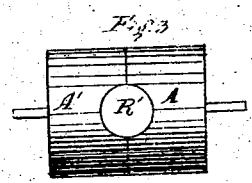
Witnesses:
James Densmore,
William Wansleben
Inventor:
G. W. N. Yost,
by Atty Jo. C. Clayton

United States Patent Office.

GEORGE W. N. YOST, OF CORRY, PENNSYLVANIA, ASSIGNOR TO THE CORRY MACHINE COMPANY.

Letters Patent No. 85,159, dated December 22, 1868.

IMPROVEMENT IN HARVESTERS.

The Schedule referred to in these Letters Patent and making part of the same.

*To whom it may concern:*

I, GEORGE W. N. YOST, of Corry, Erie county, Pennsylvania, have invented a new and useful Climax Crank-Shaft Bearing, an improvement of my climax-gearing for grass and grain-cutting machines.

The following description, illustrated by the accompanying drawings, will enable others to make the invention, description and drawings having corresponding specifying characters.

Figure 1, of the drawings, is a view of my climax-body, with my climax-gearing therein.

Figure 7 is a view of my climax-yoke bolt.

Figure 8 is a view of the sleeve detached.

Figure 2 is a view of the sleeve and bolt combined.

Figure 3 is a view of the fore end of the body.

A and A' are two cases, forming my climax-body.

C, D, E, F, H, and I, are parts of the cases and body.

G and G' are the main axles, and

J, K and K', L and L', M, N, and O, are the gearing.

Enlarge the cylinder or ring I', in the middle of the yoke-bolt I, to an outside diameter of four inches, and an inside diameter of three inches, both more or less.

Make a sleeve, R, of an outside diameter of three inches, and an inside diameter of two inches, both more or less.

For convenience of repairing, if desired, put a "bush" three inches long, and an inside diameter of one and five-eighths of an inch, both more or less, into each end of the sleeve R; or the sleeve may be made smaller, and the "bushing" dispensed with.

Enlarge the hole R' in the middle of the fore end of the body A and A' to three inches, more or less, in diameter.

Turn the shaft N straight and smooth, to go in and through and revolve within the sleeve R.

Fasten one end of the sleeve R within the ring I' of the bolt I, and lock the other end of the sleeve R, within the hole R', in the fore end of the body A and A'.

A convenient way to fasten the sleeve within the ring, is to heat and shrink the ring over it, with a nipple on one, to fit into a slot in the other, and the bolts H and I, fastening the cases A and A' together, necessarily lock the sleeve within the hole R'.

The nature of the invention is in so combining the sleeve R and the bolt and ring I and I', and the body and hole, A and A' and R', as to make the sleeve practically a solid part of the body, and immovable, excepting as the body moves. Therefore,

I claim the combination of the sleeve R with the yoke-bolt I and I', and the body A and A', provided with the hole R', made and used as described for grass and grain-cutting machines.

G. W. N. YOST.

Witnesses:
  J. W. ARCHBOLD,
  FRANK H. W. GRIGG.